United States Patent
Khoury (10) Patent No.: US 7,118,360 B2
(45) Date of Patent: Oct. 10, 2006

(54) REDUCED STRESS ROTATIONAL COUPLING AND A METHOD OF USING SAME

(75) Inventor: Jihad J. Khoury, Peoria, IL (US)

(73) Assignee: Caterpillar Inc, Peoria, IL (US)

(*) Notice: Subject to any disclaimer, the term of this patent is extended or adjusted under 35 U.S.C. 154(b) by 283 days.

(21) Appl. No.: 10/608,703

(22) Filed: Jun. 27, 2003

(65) Prior Publication Data

US 2004/0266538 A1    Dec. 30, 2004

(51) Int. Cl.
  *F01C 1/00*    (2006.01)
(52) U.S. Cl. .................. 418/244 R; 403/381
(58) Field of Classification Search ........... 464/182, 464/112; 403/269, 381; 415/915; 416/244 R; 417/423.6; 418/225, 259, 270
  See application file for complete search history.

(56) References Cited

U.S. PATENT DOCUMENTS

| | | | | |
|---|---|---|---|---|
| 210,298 A | * | 11/1878 | Cline | ...... 416/244 R |
| 1,708,192 A | * | 4/1929 | Sherwood | ...... 403/269 X |
| 2,869,774 A | * | 1/1959 | Smith et al. | ...... 416/244 R X |
| 3,289,602 A | * | 12/1966 | Hudgens | ...... 418/225 X |
| 4,135,372 A | * | 1/1979 | Benson | ...... 464/112 X |
| 4,179,313 A | * | 12/1979 | Koch et al. | ...... 403/269 X |
| 5,295,788 A | * | 3/1994 | Tajima et al. | ...... 416/244 R X |
| 5,378,111 A | * | 1/1995 | Christopher | ...... 418/225 X |
| 5,655,875 A | * | 8/1997 | Sekine | ...... 415/915 |
| 6,196,802 B1 | * | 3/2001 | Matsumoto | ...... 416/244 R X |
| 6,311,943 B1 | * | 11/2001 | Tang | ...... 416/244 R X |
| 6,394,753 B1 | * | 5/2002 | Maki et al. | ...... 416/244 R X |

* cited by examiner

*Primary Examiner*—Greg Binda
(74) *Attorney, Agent, or Firm*—Liell & McNeil (57) ABSTRACT

A rotational coupling couples a rotor, or driven member, to a rotating shaft. The rotational coupling reduces stress by distributing a driving force from a coupling over a planar contact area on the rotor. The rotor is coupled to a rotating shaft via a coupling that can include a pin. The coupling includes a drive surface that is connected to, but radially separated from, the rotating shaft. An inner surface of the rotor includes at least one contact surface, and the coupling includes at least one drive surface. A portion of the coupling including the drive surface can be comprised of a stronger material than a portion of the rotor that includes the contact surface. The drive surface and the contact surface contacting over a planar contact area, over which the driving force from the shaft is distributed.

15 Claims, 4 Drawing Sheets

REDUCED STRESS ROTATIONAL COUPLING AND A METHOD OF USING SAME

TECHNICAL FIELD

The present invention relates generally to rotational couplings, and more specifically to a method of reducing stress within a rotational coupling of a pump.

BACKGROUND

In many apparatuses, such as pumps, a rotational coupling includes a first component coupled to a second rotating component. For instance, a pump may include a rotational coupling that includes a rotor, or driven member, coupled to a rotating shaft via a coupling. Often, the coupling includes a pin that extends through a pin bore defined by the shaft. The rotating shaft and the pin extending through the shaft are received in an opening defined by the rotor. Thus, when the shaft is rotated, a portion of the pin on each side of the shaft makes contact with the rotor and drives the rotor to rotate with the shaft. Depending on the pump, the rotation of the shaft can be powered by various means, including but not limited to, an electric motor.

Often, in order to reduce manufacturing costs, the rotor is comprised of a relatively weak material, such as powered metal. Those skilled in the art will appreciate that components comprised of powered metal have been proven to be relatively simple and economical to manufacture. For instance, the rotor can be manufactured by consolidating the metal in its powered state into a mold or die having the desired shape of the rotor. The mold or die can then be heated in order to strengthen the powered metal. To further reduce manufacturing costs without decreasing the strength of the rotational coupling, the pin extending through the shaft is often machined to be cylindrical. The cylindrical pin and a cylindrical pin bore are relatively simple and economical to manufacture. Further, because that the cylindrical pin bore can be machined to be relatively small, the cylindrical pin bore does not unacceptably decrease the strength of the shaft.

Although the rotational coupling including the powdered metal rotor and the cylindrical pin has been found to be relatively economical to manufacture, there is room for improvement. When the shaft is rotated, drive surfaces of the pin located on opposite sides of the shaft make contact with contact surfaces of the rotor in order to drive the rotor. Because the pin is cylindrical, the drive surfaces contacting the contact surfaces are relatively thin. Thus, the driving force required to rotate the rotor is distributed over a relatively small load contact area between the pin and the rotor. Those skilled in the art will appreciate that stress caused by the driving force is equal to the driving force over the area on which the driving force acts. Thus, the smaller the contact area, the greater the stress caused by the driving force. Moreover, because the contact surfaces of the rotor are comprised of powdered metal, a relatively weak material, the contact surfaces may have a reduced tolerance to wear caused by the stress of the driving force acting on the contact surfaces. The wear of the rotor may lead to premature failure of the rotational coupling.

The wear on the rotational coupling has been found to be particularly unacceptable in situations in which the rotational coupling is rotating against relatively high pressures. For instance, in some fuel transfer pumps, the rotational coupling can be used to transfer fuel through the pump. The rotational coupling can be positioned within a cavity defined by a cam ring such that the rotational coupling and the cavity are eccentric, meaning that each has a different center. Thus, a clearance defined by an outer surface of the rotor and an inner surface of the cam ring will vary in size around the circumference of the rotational coupling. When the rotor rotates, rollers driven by the rotor can make contact with the inner surface of the cam ring and push the fuel within the clearance around the circumference until the fuel reaches a minimum clearance area. The high pressure created at the minimum clearance area will push the trapped fuel out of the clearance and through an outlet port of the pump. As the fuel is pushed around the circumference by the rollers, a void is created within the clearance. Low pressure created by the void will draw more fuel into the clearance for circulation, and the process will repeat itself.

In order to increase the fuel pressure being delivered from the pump, the rotational speed of the shaft, and thus the rotor, is increased. The faster the rotor is rotated, the greater the pressure within the clearance against which the driving force must rotate the rotational coupling. The greater the driving force, the greater the stress acting on the rotor causing wear and possibly premature failure. Thus, the problems associated with wear, especially rotor wear, caused by stress is increased at higher pressure applications.

Although engineers have found that the wear on the rotor can be decreased by comprising the rotor from a relatively strong material, such as steel, the costs and difficulty associated with manufacturing a steel rotor may be unacceptably high. Moreover, although the wear on the rotor may be decreased by altering the cylindrical shape of the pin to include a larger drive surface, the manufacturing costs associated with the machining of the pin and pin bore in a shape other the cylindrical may also be unacceptably high. In addition, a larger pin bore may decrease the strength of the shaft.

It should be appreciated that the above discussed wear problems may be present in rotational couplings used within apparatuses other than pumps. The present invention is directed at overcoming one or more of the problems as set forth above.

SUMMARY OF THE INVENTION

In one aspect of the present invention, a rotational coupling includes a driven member that includes an inner surface that defines an opening, and includes at least one contact surface. A rotating shaft is received in the opening of the driven member. The driven member is coupled to the rotating shaft by a coupling that includes at least one drive surface connected to, but separated a radial distance from, the rotating shaft. The drive surface and the contact surface make contact over a planar contact surface.

In another aspect of the present invention, a pump includes a pump housing in which a rotational coupling is positioned. The rotational coupling includes a rotor that includes an inner surface. The inner surface defines an opening and includes at least one contact surface. The opening of the rotor receives a rotating shaft. A coupling couples the rotor to the rotating shaft. The coupling includes at least one drive surface radially separated from, but connected to, the rotating shaft. The drive surface and the contact surface make contact over a planar contact area.

In yet another aspect of the present invention, stress within a rotational coupling is reduced by distributing a driving force originating from the rotating shaft over a planar contact area on the driven member. A drive surface is separated a radial distance from, but connected to the rotating shaft.

DETAILED DESCRIPTION

Figure 1:
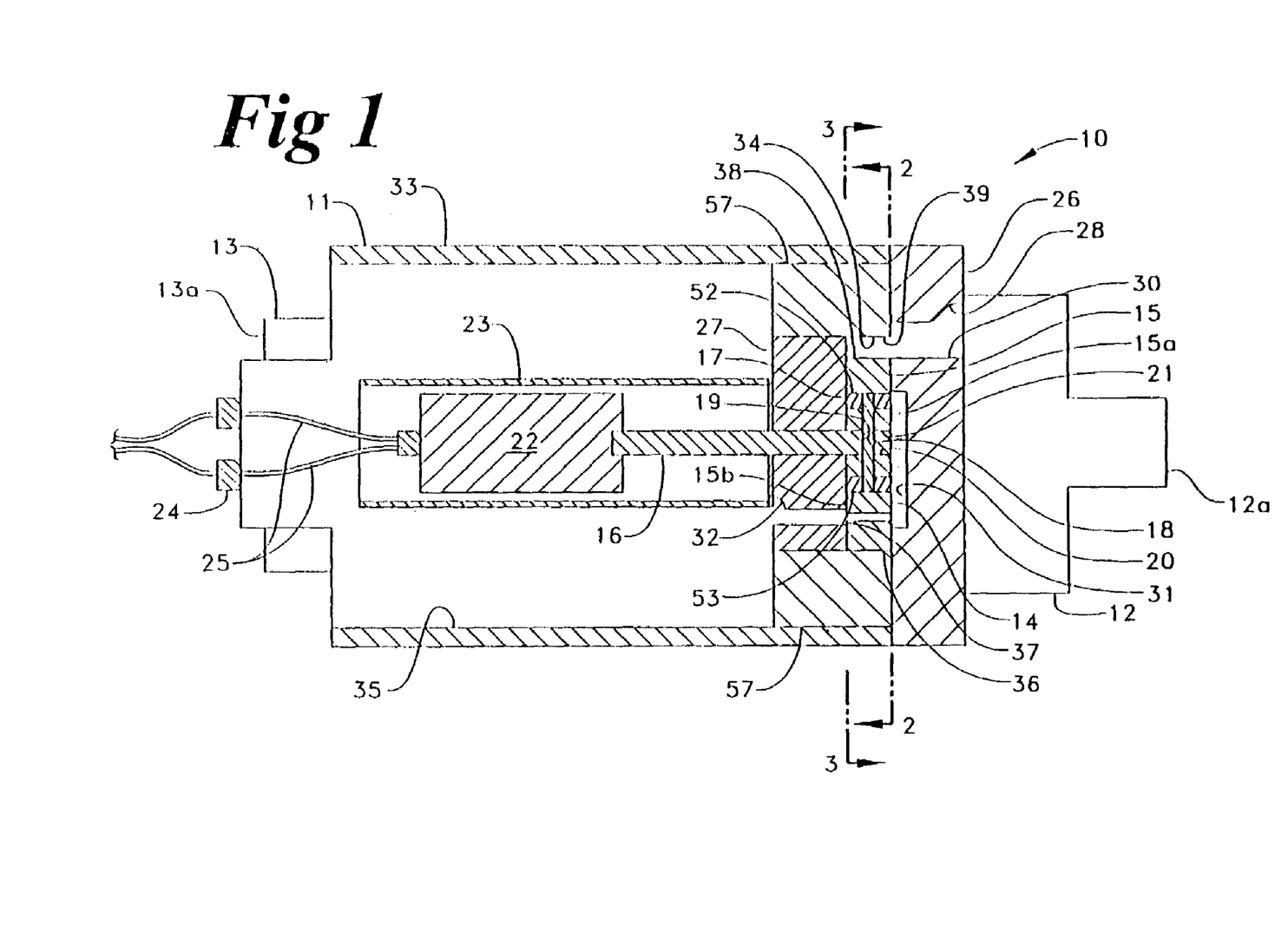
FIG. 1 is cross sectional diagrammatic representation of a pump, according to the present invention.

Referring to FIG. 1, there is shown a cross sectional diagrammatic representation of a pump, according to the present invention. The pump 10 includes a pump housing 11 including an inlet portion 12 defining at least one pump inlet 12a, a motor portion 33, and an outlet portion 13 defining at least one pump outlet 13a. The inlet portion 12 and outlet portion 13 are preferably attached to opposite ends of the motor portion 33 in a conventional manner, including but not limited to, use of threaded attachments. A cam ring 57 is positioned within the motor portion 33 of the pump housing 11, and a rotational coupling 14 is positioned within the cam ring 57. It should be appreciated that although the rotational coupling 14 will be illustrated as included within the pump 10, the rotational coupling 14 can be included within, or outside, other types of apparatuses. The rotational coupling 14 includes a rotor 15, or driven member, operably coupled to a rotating shaft 16 via a coupling 17. An outer surface 38 of rotor 15 and an inner surface 39 of the cam ring 57, at least in part, define a clearance 34. The rotor 15 defines at least on roller cavity 37 in which a roller 36 is positioned. As the rotor 15 rotates, the rotor 15 drives the roller 36 to move along the clearance 34.

The rotating shaft 16 is received in an opening 20 defined by an inner surface 21 of the rotor 15. In the illustrated embodiment, the coupling 17 includes a pin 18 that preferably extends through a pin bore 19 defined by the rotating shaft 16. Nevertheless, those skilled in the art will appreciate that other embodiments could omit the pin in favor of some other structures, such as a collar mounted on the shaft. Although the pin 18 could have various shapes, including but not limited to, rectangular, the pin 18 preferably is cylindrical. The pin bore 19 is preferably perpendicular to an axis of the rotating shaft 16 such that the rotor 15 is coupled to the rotating shaft 16 at a 90° angle. However, it should be appreciated that the present invention contemplates the rotor 15 being coupled to the rotating shaft 16 by the pin 18 oriented at an angle other than 90° to the shaft 16.

The rotating shaft 16 is preferably coupled to an electric motor 22 positioned within the motor portion 33 of the pump housing 11. The electric motor 22 is preferably housed in motor housing 23 that protects the electrical components of the motor 22 from the fuel being circulated through the pump 10. The electric motor 22 is preferably in communication with an electrical connection 24 via electrical wires 25. It should be appreciated that the electrical wires 25 are protected from the fuel within the pump 10 in a conventional manner, such as by an insulative coating. The electrical connection 24 can be connected to a power source (not shown) via at least one communication line. When electric current is supplied to the motor 22, the motor 22 will rotate the shaft 16. Those skilled in the art will appreciate that the rotational coupling 14 of the present invention can be used in pumps other than electrically powered pumps. For instance, the rotational coupling 14 can be used in a mechanically driven pump in which a rotating shaft is operably coupled to an engine via a conventional linkage, which can be located outside the housing 11.

The rotor 15 positioned within the cam ring 57 includes a front side 15a and a rear side 15b. An inlet plate 26 is positioned within the inlet portion 12 of the pump housing 11 and adjacent to the front side 15a of the rotor 15. The inlet plate 26 is stationary and includes a diameter similar to the cam ring 57. The inlet plate 26 can be secured to the cam ring 57 in a conventional method, such as bolting the two components to one another. The inlet plate 26 defines an inlet pressure cavity 31 and at least one inlet port 28 that includes a low pressure fill cavity 30. An outlet plate 27 is positioned within the cam ring 57 and adjacent to the rear side 15b of the rotor 15. The outlet plate 27 is stationary and includes a diameter similar to the rotational coupling 14. The outlet plate 27 defines an opening 20 in which the rotating shaft 16 is received. The outlet plate 27 preferably defines at least one outlet port (not shown in cross sectional representation) and an outlet pressure cavity 32. The clearance 34 is in fluid communication with the pump inlet 12a via the inlet port 28, and with the pump outlet 13a via the outlet port and at least on fuel passage 35 defined by the motor housing 23 and the pump housing 11.

Figure 2:
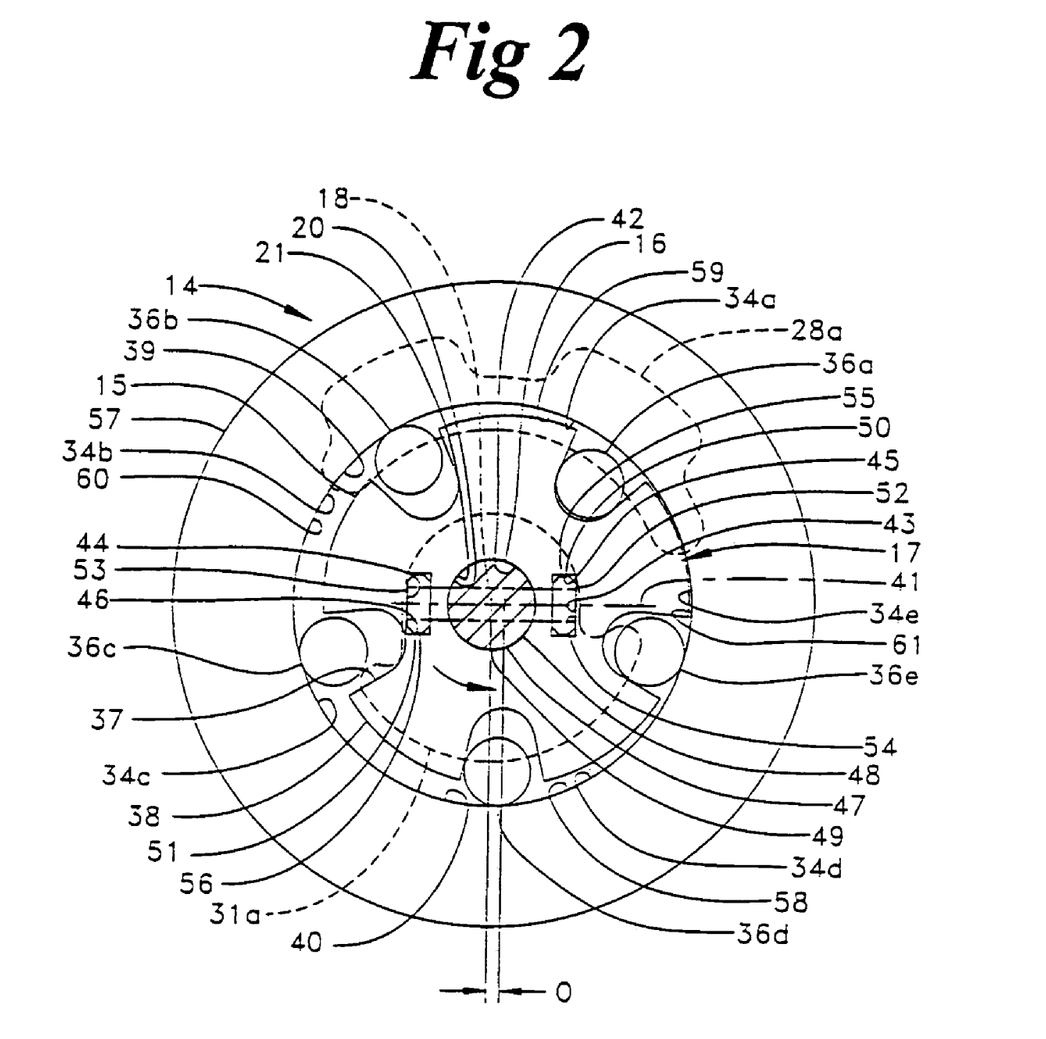
FIG. 2 is a front sectioned view of a rotational coupling included within the pump of FIG. 1, as viewed along section lines 2—2.
Figure 3:
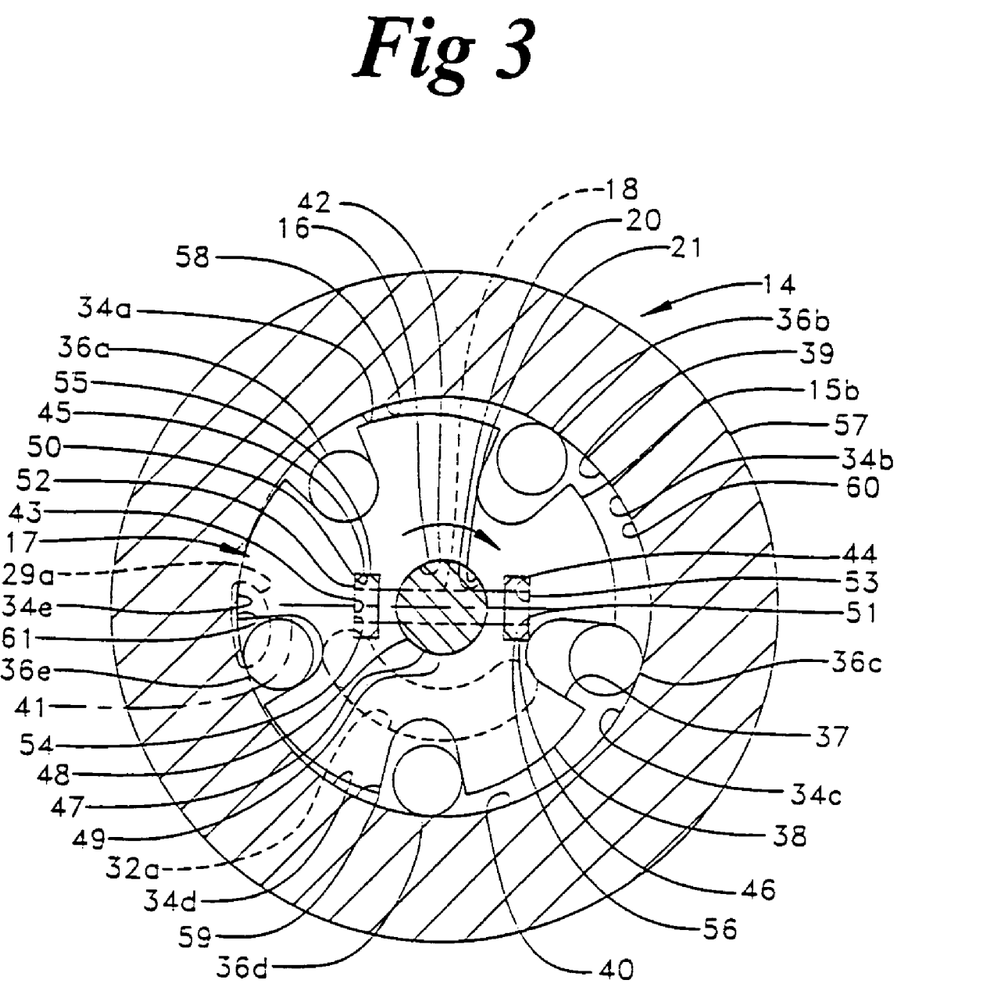
FIG. 3 is a rear sectioned view of the rotational coupling of FIG. 1, as viewed along section lines 3—3.

Referring to FIGS. 2 and 3, there are shown a front view and a rear view of the rotational coupling 14 included within the pump 10 in FIG. 1, respectively. The rotational coupling 14 is positioned within a circular cavity 40 defined by the cam ring 57. The rotational coupling 14 and the circular cavity 40 are eccentric, meaning that they are parallel but do not share the same center (see offset 0 in FIG. 2). Thus, the volume of the clearance 34 defined by the outer surface 38 of the rotor 15 and the inner surface of cam ring 57 varies in size at different points along the circumference of the rotor 15. The clearance 34 includes a minimum clearance 61 and a maximum clearance 60 that are separated from one another by a portion 58 increasing in size and a portion 59 decreasing in size. For purposes of this discussion, the portion increasing in size and the portion decreasing in size will herein be referred to as the increasing portion 58 and the decreasing portion 59. The clearance 34 can be separated into a first volume 34a, a second volume 34b, a third volume 34c, a forth volume 34d, and a fifth volume 34e. Each volume is, at least partially, separated from adjacent volumes by rollers 36a–e. Although there can be any number of rollers 36, there are preferably five rollers 36a–e evenly spaced around the circumference of the rotor 15. Each roller 36a–e is positioned within a roller cavity 37 defined by the rotor 15.

As the rotor 15 rotates through 360°, each volume 34a–e will pass through the increasing portion 58, the maximum clearance 60, the decreasing portion 59 and the minimum clearance 61. As one of the volumes rotates through the increasing portion 58, which is approximately 150° of the rotation, the decreasing pressure will draw fuel into the volume. Referring specifically to FIG. 2, the flow of the fuel from the inlet port 28 to the clearance 34 is illustrated by an inlet flow area 28a. As the volume passes through the maximum clearance 60, which is approximately 30° of the rotation, the flow of fuel into the volume will stop due to the stabilized pressure. As the volume passes through the decreasing portion 59 of the clearance, which is approximately 150° of the rotation, the increasing pressure will push the fuel out of the volume and into the outlet port defined by the outlet plate 27. Referring specifically to FIG. 3, the flow of the fuel from the clearance 34 to the outlet port is illustrated by the outlet flow area 29a. Finally, as the volume rotates through the minimum clearance 61, there will be no fuel flowing into or out of the volume. Thus, a void will remain within the volume until fuel can be again drawn into the volume via the increasing portion 58 of the clearance 34.

Referring to both FIGS. 2 and 3, as the rotor 15 rotates, the rollers 36a–e will move in and out of contact with the inner surface 39 of the cam ring 57 due to the difference in pressure acting on the outside and inside of the rollers 36a–e. The pressure acting on the outside of the rollers 36 is created by the varying fuel pressure within the clearance 34. Whereas, the pressure acting on the inside of the rollers 36 is created by centrifugal forces caused by the rotation and by the pressure of the fuel trapped within the inlet pressure cavity 31 (shown in FIG. 1) and the outlet pressure cavity 32 (shown in FIG. 1). The pressure of the fuel within the inlet pressure cavity 31 is illustrated in FIG. 2 as inlet high pressure area 31a, and the pressure of the fuel within the outlet pressure cavity 32 is illustrated in FIG. 3 as outlet high pressure area 32a. The inlet and outlet high pressure areas 31a and 32a act on the inside of the rollers 36c–e in order to maintain contact between the rollers 36c–e and the inner surface 39 of the cam ring 57. The pressure of the inlet and outlet high pressure areas 31a and 32a is greater than the increasing pressure within the decreasing portion 59 of the clearance 34. It is important that the rollers 36c–e remain in contact with the inner surface 39 of the cam ring 57 while rotating through the decreasing portion 59 in order to rotate the volumes 34c–e to the minimum clearance 61 which is in fluid communication with the outlet port.

Referring still to both FIGS. 2 and 3, as the rotor 15 rotates, in order to maintain the varying volume of the clearance 34 while avoiding contact between the outer surface 38 of the rotor 15 and the inner surface 39 of the cam ring 57, the rotor 15 and the rotating shaft 16 extending through the opening 20 of the rotor 15 are concentric, meaning that they share the same center. The inner surface 21 defining the opening 20 of the rotor 15 includes an alignment portion 42 centered between a first drive portion 43 and a second drive portion 44. The shaft 16 extends through the alignment portion 42 of the opening 20. The alignment portion 42 includes a concentric alignment surface 47. The concentric alignment surface 47 and an outer surface 48 of the rotating shaft 16 include a concentric alignment contact area 49.

The first drive portion 43 of the opening 20 preferably includes a first contact surface 45, and the second drive portion 44 of the opening 20 includes a second contact surface 46. The contact surfaces 45 and 46 are the surfaces of the rotor 15 on opposite sides of the shaft 16 that are in contact with the coupling 17 when the shaft 16 is rotating. The coupling 17 preferably includes a first drive surface 50 and a second drive surface 51. The first and second drive surfaces 50 and 51 are the surfaces of the coupling 17 that make contact with the first and second contact surfaces 45 and 46, respectively, when the shaft 16 is rotating. A portion of the coupling 17 that includes the first and second drive surfaces 50 and 51 can be, but need not necessarily be, comprised of a material different than a material comprising a portion of the rotor 15 that includes the first and second contact surfaces 45 and 46. The rotor 15, including the portion including the contact surfaces 45 and 46, is comprised in the illustrated example of a relatively weak material, specifically powered metal. Those skilled in the art will appreciate that the powered metal rotor is relatively easy and economical to manufacture. Thus, the portion of the coupling 17 including the drive surfaces 50 and 51 is made of a material different than powered metal. Preferably, the portion of the coupling 17 including the drive surfaces 50 and 51 is comprised of a relatively strong material, such as steel. Those skilled in the art will appreciate that steel has better load carrying characteristics than a weaker material.

The first contact surface 45 and the first drive surface 50 contact over a first planar contact area 55, and the second planar contact surface 46 and the second drive surface 51 contact over a second contact area 56. Although the rotational coupling 14 is illustrated as rotating clockwise, it should be appreciated that the present invention contemplates the rotational coupling 14 rotating counterclockwise. In order to distribute the driving force of the coupling 17, the drive surfaces 50 and 51 and the contact surfaces 45 and 46 are planar. Although the two planar contact areas 55 and 56 positioned on opposite sides of the rotating shaft 15 is preferred, the present invention contemplates the rotational coupling 14 including various numbers of contact areas, including, but not limited to, only one planar contact area. For instance, the pin 18 can be partially received in, rather than extend through, the pin bore 19. Thus, the pin 18 would extend on only one side of the rotating shaft 16 and include only one drive surface. As shown in FIGS. 2 and 3. planar contact areas 55 and 56 are parallel with each other and also parallel with the axis of pin 18.

Although the drive surfaces 50 and 51 can be included as machined flat surfaces on the pin 18, the first drive surface 50 and the second drive surface 51 are preferably positioned on a first shoe 52 and a second shoe 53, respectively. The first shoe 52 and the second shoe 53 are preferably coupled to the pin 18 on opposite sides of the rotating shaft 16 and received in the drive portions 43 and 44 of the opening 20. Each shoe 52 and 53 is preferably radially separated from an outer diameter of the rotating shaft 16 via a predetermined distance. Those skilled in the art will appreciate that the predetermined distance is considered the moment arm of the rotational coupling 14. The greater the moment arm, the less driving force required to achieve the torque needed to rotate the rotor 15 along with the shaft 16. It should further be appreciated that the predetermined distance can vary among rotational couplings depending on the use and size of the rotational coupling. However, the predetermined distance is preferably the greatest distance from the outer diameter of the rotating shaft 16 that the shoes 52 and 53 can be positioned without the size of the opening 20 receiving the shoes 52 and 53 unduly weakening the rotor 15. Thus, the contact surface(s) are connected to the rotating shaft via a pin as illustrated, or possibly via some other structure such as a collar mounted on a rotating shaft. The pin or collar portion of the coupling is connected to rotate with the shaft. The smaller the width of the rotor 15 between the opening 20 and the outer surface 38, the more susceptible the rotor 15 may be to premature failure in that area due to wear.

Figures 4A, 4B:
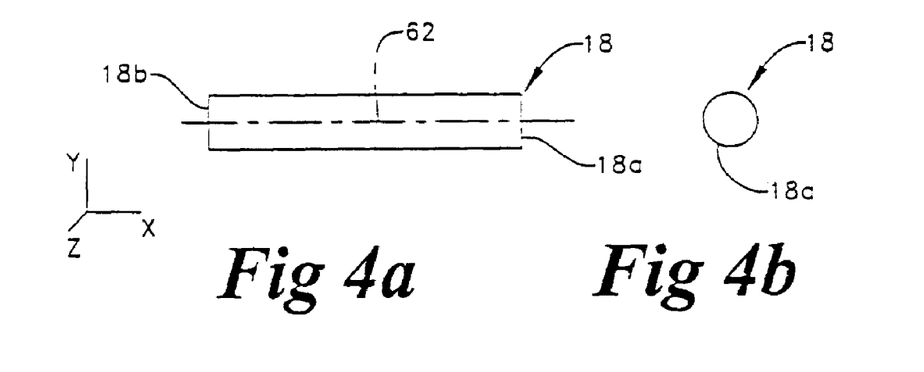
FIG. 4a is a side view of a pin included within the rotational coupling of FIG. 2.
FIG. 4b is a top view of the pin included within the rotational coupling of FIG. 2.

Referring to FIGS. 4a and 4b, there are shown a side view and a top view of the pin 18 included within the rotational coupling 14 illustrated in FIG. 2, respectively. The cylindrical pin 18 includes a centerline 62 that extends along a length of the pin 18, a top end 18a and a bottom end 18b. It should be appreciated that the cylindrical pin 18 is symmetrical along an x-axis, a y-axis, and a z-axis. Thus, the top end 18a and the bottom end 18b are identical, and can be positioned on either side of the rotating shaft 16 during assembly. Therefore, during assembly of the rotational coupling 14, there is little, if any, risk of inappropriately positioning the pin 18 within the pin bore 19 defined by the shaft 16.

Figures 5A, 5B:
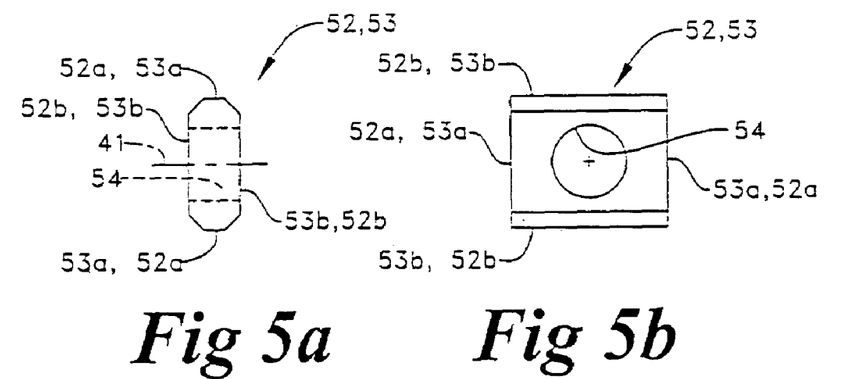
FIG. 5a is a side view of a shoe included within the rotational coupling of FIG. 2.
FIG. 5b is a top view of the shoe included within the rotational coupling of FIG. 2.

Referring to FIGS. 5a and 5b, there are shown a side view and a top view of the shoes 52 and 53 included within the rotational coupling 14 of FIG. 2, respectively. Although only one shoe is illustrated in FIGS. 5a and 5b, it should be appreciated that the first and second shoes 52 and 53 are preferably identical to the one another in size and shape. Thus, FIGS. 5a and 5b represent both shoes 52 and 53. Each shoe 52 and 53 is preferably rectangular and includes a centerline 41. A bore 54 defined by each shoe 52 and 53 is positioned along the centerline 41. The bores 54 are preferably cylindrical such that the cylindrical pin 18 can be partially received in the bores 54. Due to the symmetry of the shape of the shoes 52 and 53, either shoe 52 and 53 can be positioned on opposite ends of the pin 18, resulting in ease in assembly. After each end of the pin 18 is received in the bores 54, the first and second shoes 52 and 53 can be received in the first and second driving portions 43 and 44 of the opening 20, respectively. The shoes 52 and 53 preferably include beveled edges in order to aid in receipt of the shoes 52 and 53 into the driving portions 43 and 44 of the inner surface 21 of the rotor 15 without interfering with the rounded corners of the first and second drive portions 43 and 44 of the opening 20. Each shoe 52 and 53, being rectangular, will have two parallel, relatively short sides 52a, 53a and two parallel, relatively long sides 52b, 53b, respectively. Thus, there is only one orientation of the shoes 52 and 53 that corresponds with the shape of the driving portions 43 and 44. The relatively short sides 52a, 53a of the shoes 52 and 53 must be parallel with the centerline 62 of the pin 18 in order for the shoes 52 and 53 to be received within the driving portions 43 and 44 of the rotor opening 20. As shown in FIGS. 2 and 3, the shoes 52 and 53 will be trapped between the contact surfaces 45 and 46 of the rotor 15 and the pin 18. Those skilled in the art should appreciate that the shoes 52 and 53 could be other shapes and use a different method of coupling each shoe 52 and 53 to the pin 18. For instance, the present invention contemplates each shoe being a steel plate with a planar drive surface that is positioned between the contact surfaces and the pin. Because the shoe would not define a bore in which the pin can be received, each shoe could be attached to the pin by various methods known in the art, including but not limited to, press fitting.

INDUSTRIAL APPLICABILITY

Although the operation of the present invention will be described for the rotational coupling 14 included within the pump 10, those skilled in the art will appreciate that the rotational coupling can operate similarly in apparatuses other than pumps. In addition, although the pump 10 is illustrated as an electrically-powered, fixed displacement fuel transfer and priming pump 10, it should be appreciated that the present invention could operate in any pump requiring a rotational coupling, including but not limited to, various types of centrifugal pumps. Moreover, the present invention contemplates use in pumps circulating various types of fluids, and powered by means other than an electrical motor. For instance, the rotational coupling 14 could be used in a mechanically driven pump in which a rotating shaft is operably coupled to the engine via a conventional linkage.

Referring to FIGS. 1–4, in order to reduce the stress caused by the driving force of the coupling 17 during operation of the rotational coupling 14, the steel shoes 52 and 53 are preferably trapped between the pin 18 and the powered metal rotor 15 during assembly of the rotational coupling 14. Because the shoes 52 and 53 are preferably machined from steel, which is a relatively strong material, the steel shoes 52 and 53 can absorb, without undue wear, at least part of the stress caused by the driving force of the coupling 17 during operation of the rotational coupling 14. Although the shoes 52 and 53 are preferably comprised from a strong material such as steel, it should be appreciated that the present invention contemplates the shoes 52 and 53 being made from various materials. The rotor 15 can be manufactured from powered metal because powdered metal rotors are relatively simple and economical to manufacture. The rotor 15 can be easily formed from various powered metals into the desired shape of the rotor 15 by conventional methods. For instance, the metal in its powered state can be consolidated into a mold or die that has the desired shape of the rotor. The powered metal form can then be heated in order to bind the powered metal particles to one another and strengthen the rotor. Although the powered metal rotor 15 is preferred because it is cost efficient to produce, it should be appreciated that the present invention contemplates rotors made from other materials, including possibly steel or plastic.

In order to trap the shoes 52 and 53 between the pin 18 and the contact surfaces 45 and 46 of the rotor 15, the pin 18 is first positioned within the pin bore 19 such that the pin 18 extends through the shaft 16. Because the pin 18 is symmetrical, and thus has an identical top and bottom end 18a and 18b, there is little, if any, risk of inappropriately positioning the pin 18 within the pin bore 19. Because the majority of the driving force created by the pin 18 will be distributed over the contact areas 45 and 46 of the rotor 15 and the shoes 52 and 53, the pin 18, and thus the pin bore 19, can be machined to be cylindrical and relatively small. Because a relatively large pin bore 19 through the shaft 16 can weaken the strength of the shaft 16, a relatively small pin bore 19 is preferred. Once the pin 18 has been inserted through the pin bore 19, the first shoe 52 and second shoe 53 can be coupled to opposite ends of the pin 18 on opposite sides of the shaft 16. Each end of the pin 18 can be received into the bore 54 of each shoe 52 and 53. Because the shoes 52 and 53 are rectangular and the bores 54 are centered within the shoes 52 and 53, the first shoe 52 and the second shoe 53 can be used on either side of the shaft 16. Thus, one shape of a shoe can be manufactured for use as both the first shoe 52 and the second shoe 53. This is advantageous because it reduces, if not eliminates, the risk of incorrectly assembling the shoes 52 and 53 onto the pin 18.

Until the shaft 16 is received in the opening 20 of the rotor 15, the shoes 52 and 53 may not be securely orientated on the pin 18, meaning the shoes 52 and 53 may be free to slide along the outer surface of the pin 18. In order to secure the shoes 52 and 53 in the desired position on the pin 18, the shoes 52 and 53 are preferably trapped between the contact surfaces 45 and 46 and the pin 18. The rotor 15 is slid onto the shaft 16 such that the shaft 16 is received within the alignment portion 42 of the rotor opening 20, the first shoe 52 coupled to the pin 18 is received in the first drive portion 43 of the rotor opening 20, and the second shoe 53 coupled to the pin 18 is received in the second drive portion 44 of the rotor opening 20. In order to be received in the first drive portion 43 of the opening 20, the first shoe 52 must be positioned at the end of the pin 18 in order to correspond with the shape of the first drive portion 44. Similarly, the second shoe 53 is preferably positioned at the end of the pin 18 on the opposite side of the shaft 16 in order to correspond with the shape of the second drive portion 45. Because the shoes 52 and 53 are rectangular, the shoes 52 and 53 must be in the proper orientation, meaning the relatively short sides 52a and 53a are parallel with the centerline 62 of the pin 18, in order to be received within the drive portions 43 and 44. Further, it should be appreciated that the drive portions 43 and 44 include rounded corners in order to reduce the possibility of stress concentrations around the corners. The beveled edges of the shoes 52 and 53 aid in the receipt of the shoes 52 and 53 into the rounded corners of the drive portions 43 and 44.

Once both shoes 52 and 53 are receive within the respective drive portions 43 and 44, the inner surface 21 defining the first and second drive portions 43 and 44 trap the first and second shoes 52 and 53 between the pin 18 and the first and second contact surfaces 45 and 46, respectively. Because of the shape of the drive portions 43 and 44, each shoe 52 and 53 is preferably secured at the predetermined distances away from the outer diameter of the shaft 16 on opposite sides of the shaft 15. However, it should be appreciated that the drive portions 43 and 44 of the opening 20 could be shaped such that they trap the shoes 52 and 53 between the pin 18 and the rotor 15 at various distances from the shaft 16. It should further be appreciated that the shoes 52 and 53 could be steel plates positioned between the pin 18 and the contact surfaces 45 and 46 and secured by means known in the art, such as press fitting. Further, once the shaft 16 is received in the alignment portion 42 of the opening 20, the outer surface 48 of the shaft 16 preferably comes in contact with the concentric alignment surface 47 of the alignment portion 42. Moreover, once the shaft 16 is received through the opening 20 of the rotor 15, the rotor 15 and the shaft 16 are concentric, meaning they share the same center. After the rotational coupling 14 is assembled, it can be positioned and secured in the illustrated pump 10 by methods known in the art.

In order to activate the pump 10, electric current is supplied to the electric motor 22 from the power source (not shown) via the electrical connection 24 and the communication wires 25. As the motor 22 receives the electrical current, the motor 22 will begin to rotate the shaft 16 coupled to the motor 22. As the shaft 16 begins to rotate, the coupling 17 extending through the shaft 16 will also begin to rotate. The drive surfaces 50 and 51 of each shoe 52 and 53 will make contact with the contact surfaces 45 and 46 of the rotor 15, forming the first and second planar contact areas 55 and 56, respectively. The driving force required to rotate the rotor 15 will be distributed over the first and second planar contact areas 55 and 56. It should be appreciated that the driving force must be sufficient to rotate the rotor 15 and rollers 36 against the resistance created by fuel pressure within the clearance 34. However, the present invention reduces the force required to rotate the rotor 15 by radially separating the drive surfaces 50 and 51 of the shoes 52 and 53 from the rotating shaft 16 by the predetermined distance. Because the driving force rotating the rotor 15 is acting over the planar contact areas 55 and 56 at the predetermined distance from the rotating shaft 16, the force required to rotate the rotor 15 is reduced. Those skilled in the art will appreciate that the predetermined distance is considered the coupling's moment arm, and the greater the moment arm, the less driving force required to achieve sufficient torque to rotate the rotor 15. The predetermined distance is preferably as large as possible without unacceptably reducing the strength of the rotor 15 between the opening 20 and the outer surface 38 of the rotor 15. Those skilled in the art will appreciate that a sufficient width should remain between the opening 20 and the outer surface 38 of the rotor 15 in order to reduce the likelihood of premature failure due to wear of the rotor 15.

The driving force of the coupling 17 acting on the rotor 15 creates a stress that is distributed over the first and second planar contact areas 55 and 56. The first and second planar contact areas 55 and 56 are the areas in which the first second drive surfaces 50 and 51 of the shoes 52 and 53 contact the first and second contact surfaces 55 and 56 of the rotor 15, respectively. Those skilled in the art appreciate that stress equals force over area. Thus, because the contact areas 55 and 56 are planar, the contact areas 55 and 56 include a larger area over which the driving force can be distributed than would a surface of the pin 18. Without the shoes 52 and 53, a contact area between the pin 18 and the rotor 15 would be thin due to the cylindrical shape of the pin 18. Therefore, the planar contact areas 55 and 56 reduce the stress within the shoes 52 and 53 and rotor 15 caused by the driving force. Further, because the shoes 52 and 53 are made from steel, which is a relatively strong material, the shoes 52 and 53 can better withstand the stress caused by the driving force than a weaker material.

As the coupling 17 drives the rotor 15 to rotate, the rotor 15 drives the rollers 36 to also rotate. Although the operation of the present invention will be discussed for roller 36a and volume 34a, it should be appreciated that each roller 36a–e and each volume 34a–e rotates through the clearance 34 similarly. As the roller 36a is rotated through the increasing portion 58 of the clearance 34, the pressure within the clearance 34 acting on the outside of roller 36a will decrease, allowing the centrifugal force acting on the inside of the roller 36a to push the roller 36a into contact with the inner surface 39 of the cam ring 57. When the roller 36a makes contact with the inner surface 39, the roller 36a will separate the first volume 34a of the clearance 34 from the adjacent volume 34e. As the roller 36a rotates through the increasing portion 58, the decreasing pressure within the clearance 34 will draw fuel into the first volume 34a from a fuel source via the pump inlet 12a and the inlet port 28. Fuel will stop being drawn into the first volume 34a as the first volume 34a rotates through the maximum clearance 60. However, as the rotor 15 rotates and drives the roller 36a through the decreasing clearance 59, the increasing pressure will push the fuel from the clearance 34 to the outlet port. As the first volume 34a passes through the minimum clearance 61, there will be little, if any, fuel within the volume 34a. Fuel will begin to be drawn into the volume 34a as the volume 34a again rotates through the increasing portion 58, and the cycle will repeat itself.

It should be appreciated that the roller 36a will remain in contact with the inner surface of the cam ring 57 as the roller 36a passes through the decreasing portion 59 despite the increased pressure acting on the outside of the roller 36a. In addition to the centrifugal forces, the high pressure areas 31a and 32a caused by trapped fuel within the inlet high pressure cavity 31 and the outlet high pressure cavity 32 will act on the inside of the roller 36a as it passes through the decreasing clearance portion 59 to maintain contact with the inner surface 39.

Those skilled in the art will appreciate that in order to increase the pressure of the fuel being delivered from the pump 10, the speed of the rotating shaft 16, and thus the rotor 15 and rollers 36, is increased. However, in order to rotate the rotor 15 and the rollers 36 against the increased fuel pressure within the clearance 34, the driving force must be increased. The increased driving force creates more stress that is distributed over the planar contact areas 55 and 56 of the rotor 15 and the steel shoes 53 and 54. The fact that the contact areas 55 and 56 are planar, the shoes 53 and 54 are comprised of steel, and the driving surfaces 51 and 52 are radially separated from the rotating shaft 16 by the predetermined distance will reduce the stress within the rotational coupling 14.

As the rotor 15 rotates along with the rotating shaft 16 and coupling 17, the pump 10 continues to draw fuel in the minimum clearance 58 and push fuel out the maximum clearance 59 by maintaining the eccentricity of the rotor 15 and the cam ring 57. In order to avoid excessive wear on the rotor 15, the eccentricity must be maintained without allowing the outer surface 38 of the rotor 15 from making contact with the inner surface 39 of the cam ring 57. In order to maintain the various sizes of the clearance 34, the shaft 16 and the rotor 15 will remain concentric. The outer surface 48 of the rotating shaft 16 and the concentric alignment surface 47 of the rotor opening 20 will preferably remain in contact during rotation, creating the concentric alignment contact area 49. The concentric alignment area 49 ensures that the rotating shaft 16 and the rotor 15 remain concentric and maintain the clearance 34. Because the alignment surface 47 and the outer surface 48 of the shaft 16 are in contact, the rotor 15 will not shift losing concentricity with the shaft 16 during rotation. It should be appreciated that although the outer surface 48 of the rotating shaft 16 and the inner surface 21 of the rotor 15 make contact with one another during rotation, the outer surface 48 of the rotating shaft 16 is not driving the rotation of the rotor 15. The contact between the shaft 16 and the alignment portion 42 of the opening 20 is to keep concentric alignment between the rotor 15 and the shaft 16 while the contact between the shoes 52 and 53 and the contact surfaces 45 and 46 is to drive the rotation of the rotor 15. Thus, the alignment and drive aspects of the rotational coupling 14 are independent.

The present invention is advantageous because it reduces the stress within the rotational coupling 14 caused by the driving force of the coupling 17 acting on the rotor 15 while maintaining relatively low manufacturing costs and simple manufacturing processes. By trapping the shoes 52 and 53 between the pin 18 and the contact surfaces 45 and 46 of the rotor 15, the stress caused by the driving force can be reduced. Trapping the shoes 52 and 53 can be accomplished without increasing the size or basic design of the pin 18. Because the planar driving surfaces 50 and 51 of the shoes 52 and 53 have a greater area than a thin line driving surface of the cylindrical pin 18, the planar contact areas 55 and 56 over which the driving force of the coupling 17 is distributed is increased. The greater the area over which the driving force is distributed, the less stress caused by the driving force. Moreover, by coupling the shoes 52 and 53 to the pin 18, the size of the planar contact areas 55 and 56 can be increased without increasing the size of the pin bore 19 through the shaft 16. Thus, the strength of the shaft 16 is not compromised by the increased planar contact areas 55 and 56.

In addition, the present invention reduces the stress within the rotational coupling 14 by radially separating the planar contact areas 55 and 56 from the rotating shaft 16 by a distance as large as possible without compromising the strength of the rotor 15. By radially separating the planar contact areas 55 and 56 from the center of the rotational coupling 14, the moment arm of the rotational coupling 14 is increased. Because the torque required to rotate the rotor 15 is the product of the driving force and the moment arm, the driving force required to rotate the rotor 15, and thus the stress caused by the driving force, is decreased as the moment arm is increased. Moreover, because the shoes 52 and 53 are preferably comprised of steel, which is a relatively strong material, the shoes 52 and 53 have a resistance to corrosion and increased load carrying characteristics. Thus, the strength of the rotational coupling 14 can be increased by the use of steel shoes 52 and 53 while maintaining low costs and high efficiency of the manufacturing process by using the powered metal rotor 15. Moreover, the present invention is advantageous because the stress within the rotational coupling 14 is reduced without affecting the concentricity of the rotational coupling 14. The concentricity is maintained by the concentric alignment contact area 49 which is separate and independent from the planar contact areas 55 and 56 over which the driving force is distributed.

Those skilled in the art will appreciate that by reducing the stress within the rotational coupling 14, the use of the rotational coupling 14 may be expanded to apparatuses operating at relatively high pressure. For instance, in order to increase the pressure of the fuel being delivery from the illustrated pump 10, the rotational coupling 14 will be driven at a greater speed. The faster the rotational coupling 14 rotates, the greater the driving force required to rotate the rotational coupling 14 against the fuel within the clearance 34. The greater the driving force, the greater the stress acting within the rotational coupling 17. Because the present invention reduces the stress caused by the driving force by trapping the steel shoes 52 and 53 between the pin 18 and the powdered metal rotor 15, the pump can withstand the stress caused by greater driving forces that rotate the rotor 15 against higher fuel pressures. Thus, the pump 10 may be able to operate at higher pumping loads without premature failure due to the stress. Moreover, by reducing the stress within the rotational coupling 14, the wear on the rotor 15 may be reduced, extending the life of the rotational coupling 14 at various pressure applications.

It should be understood that the above description is intended for illustrative purposes only, and is not intended to limit the scope of the present invention in any way. For instance, although the illustrated coupling includes a pin, those skilled in the art will appreciate that other coupling structures could be substituted. An example substitution would be a collar mounted on the shaft and including an appendage(s) to receive shoes as illustrated. It should further be understood that the present invention is applicable to any pump or other apparatus including a rotational coupling. Thus, those skilled in the art will appreciate that other aspects, objects, and advantages of the invention can be obtained from a study of the drawings, the disclosure and the appended claims.

What is claimed is:

1. A rotational coupling comprising:
   a driven member including an inner surface that defines an opening and includes at least one contact surface;
   a rotating shaft received in the opening of, and being in contact with, the driven member;
   a coupling being operable to couple the driven member to the rotating shaft, and including at least one drive surface connected to, but separated a radial distance from, the rotating shaft;
   the at least one drive surface and the at least one contact surface being in contact over a planar contact area; and wherein the coupling includes a pin at least partially received in a pin bore defined by the rotating shaft.

2. The rotational coupling of claim 1 wherein the portion of the driven member including the contact surface being comprised of a relatively weak material; and the portion of the coupling including the drive surface being comprised of a relatively strong material.

3. The rotational coupling of claim 1 wherein the coupling includes at least one shoe trapped between the at least one contact surface of the driven member and the pin; and the at least one shoe includes the at least one drive surface.

4. The rotational coupling of claim 3 wherein the at least one shoe being rectangular and including a centerline, and defining a shoe bore positioned along the centerline; and the pin being cylindrical and at least partially received in the shoe bore.

5. The rotational coupling of claim 1 wherein the inner surface of the opening defined by the driven member and an outer surface of the rotating shaft including concentric alignment surfaces in contact with one another.

6. The rotational coupling of claim 1 wherein the pin includes a cylindrical portion at least partially received in the pin bore; and the pin bore being perpendicular to an axis of the rotating shaft.

7. The rotational coupling of claim 1 wherein the at least one drive surface includes a first drive surface and a second drive surface located on opposite sides of the rotating shaft, and the at least one contact surface includes a first contact surface and a second contact surface; and the first drive surface and the second drive surface and the first contact surface and the second contact surface contacting over a first planar contact area and a second planar contact area, respectively, and the first and second planar contact areas are parallel to one another.

8. The rotational coupling of claim 7 wherein the first drive surface being included on a first shoe that is trapped between the first contact surface and a pin; and the second drive surface being included on a second shoe that is trapped between the second contact surface and the pin.

9. The rotational coupling of claim 8 wherein the first shoe and the second shoe being rectangular, comprised of a relatively strong material, radially separated from an outer diameter of the rotating shaft by a predetermined distance, and each defining a shoe bore along a centerline;

the pin being cylindrical and at least partially received in the shoe bore;

the driven member being comprised of a relatively weak material;

a pin bore defined by the rotating shaft being perpendicular to an axis of the rotating shaft; and the inner surface of the opening defined by the driven member and an outer surface of the rotating shaft including concentric alignment surfaces in contact with one another.

10. A pump comprising:

a pump housing;

a rotational coupling positioned within the pump housing; and the rotational coupling including a rotor with an inner surface that defines an opening and includes at least one contact surface; a rotating shaft received in the opening of, and being in contact with, the rotor; and a coupling being operable to couple the rotor to the rotating shaft, and including at least one drive surface radially separated from, but connected to, the rotating shaft; and the at least one drive surface and the at least one contact surface being in contact over a planar contact area; and wherein the coupling includes a pin at least partially received in a pin bore defined by the rotating shaft.

11. The pump of claim 10 wherein the portion of the rotor including the at least one contact surface being comprised of a powered metal, and the portion of the coupling including the at least one drive surface being comprised of steel.

12. The pump of claim 11 wherein the at least one drive surface includes a first drive surface and a second drive surface located on opposite sides of the rotating shaft, and the at least one contact surface includes a first contact surface and a second contact surface; and the first drive surface and the second drive surface and the first contact surface and the second contact surface contacting over a first planar contact area and a second planar contact area, respectively.

13. The pump of claim 12 wherein the first drive surface being included on a first shoe that is trapped between the first contact surface and the pin;

the second drive surface being included on a second shoe that is trapped between the second contact surface and the pin; and each shoe being radially separated from an outer diameter of the rotating shaft by a predetermined distance.

14. The pump of claim 13 wherein the pump housing includes a centerline;

the rotating shaft and circular cavity of the pump housing are eccentric with respect to one another; and an electric motor included within the pump housing and attached to the rotating shaft.

15. The pump of claim 14 wherein the inner surface of the rotor includes an alignment portion between a first drive portion and a second drive portion;

the alignment portion includes a concentric alignment surface, the first drive portion includes the first contact surface, and the second drive portion includes the second contact surface; and the concentric alignment surface and an outer surface of the rotating shaft include a concentric alignment contact area.

* * * * *